(12) United States Patent
Stevens

(10) Patent No.: US 6,302,827 B1
(45) Date of Patent: Oct. 16, 2001

(54) RESISTANCE ADJUSTING DEVICE FOR AN EXERCISE DEVICE HAVING A WHEEL DRIVEN BY A BELT

(76) Inventor: Clive Graham Stevens, 372 Hills Borough Road, Auckland (NZ)

( * ) Notice: Subject to any disclaimer, the term of this patent is extended or adjusted under 35 U.S.C. 154(b) by 0 days.

(21) Appl. No.: 09/603,985

(22) Filed: Jun. 26, 2000

(51) Int. Cl.[7] ................................................ A63B 22/06
(52) U.S. Cl. ............................ 482/63; 482/61; 188/164
(58) Field of Search ............................. 482/61, 63, 57, 482/903; 188/164, 161, 290, 293

(56) References Cited

U.S. PATENT DOCUMENTS

| | | | |
|---|---|---|---|
| 5,096,024 | * | 3/1992 | Wu ......................................... 188/267 |
| 5,711,404 | * | 1/1998 | Lee ......................................... 188/164 |
| 5,879,273 | * | 3/1999 | Wei et al. ................................ 482/63 |
| 5,916,068 | * | 6/1999 | Chisholm et al. ....................... 482/61 |
| 6,042,517 | * | 3/2000 | Gunther et al. ......................... 482/57 |
| 6,234,938 | * | 5/2001 | Chen ....................................... 482/57 |

\* cited by examiner

*Primary Examiner*—Stephen R. Crow
(74) *Attorney, Agent, or Firm*—Charles E. Baxley

(57) ABSTRACT

A resistance adjusting device for an exercise device includes a magnetic member connected to a surface of a wheel which is driven by a belt and has a shaft extending through a hub thereof. A disk is movably mounted to the shaft and a recess is defined in a first surface of the disk so as to receive a metal board therein which faces the magnetic member. A panel is mounted to the shaft and a cable extends through the panel and is fixedly connected to the disk. A spring is biased between the disk and the panel. The distance between the disk and the wheel is adjusted by pulling the cable. A resistance force between the magnetic member and the metal board is therefore adjusted.

3 Claims, 5 Drawing Sheets

FIG·2

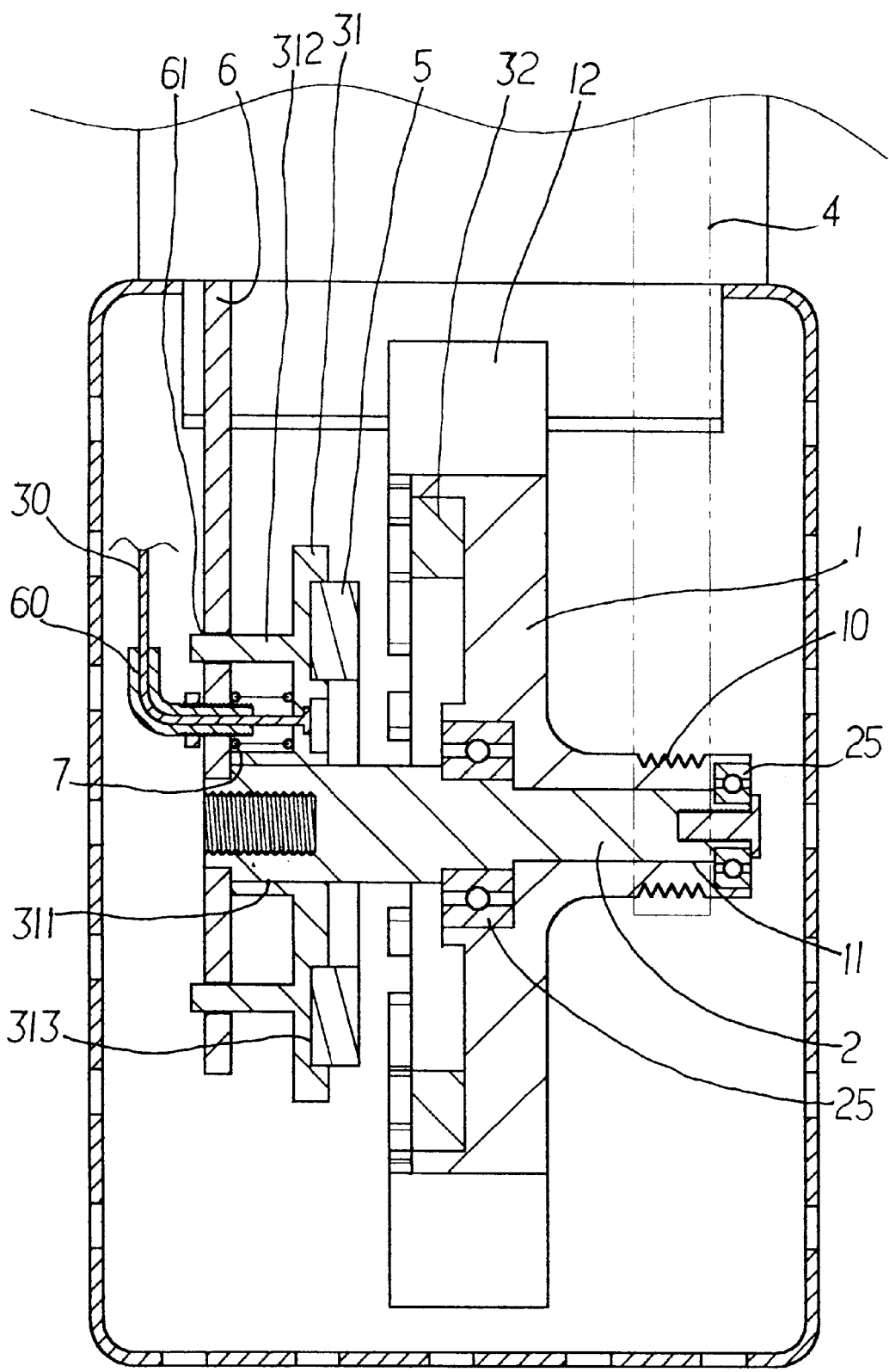
FIG·4

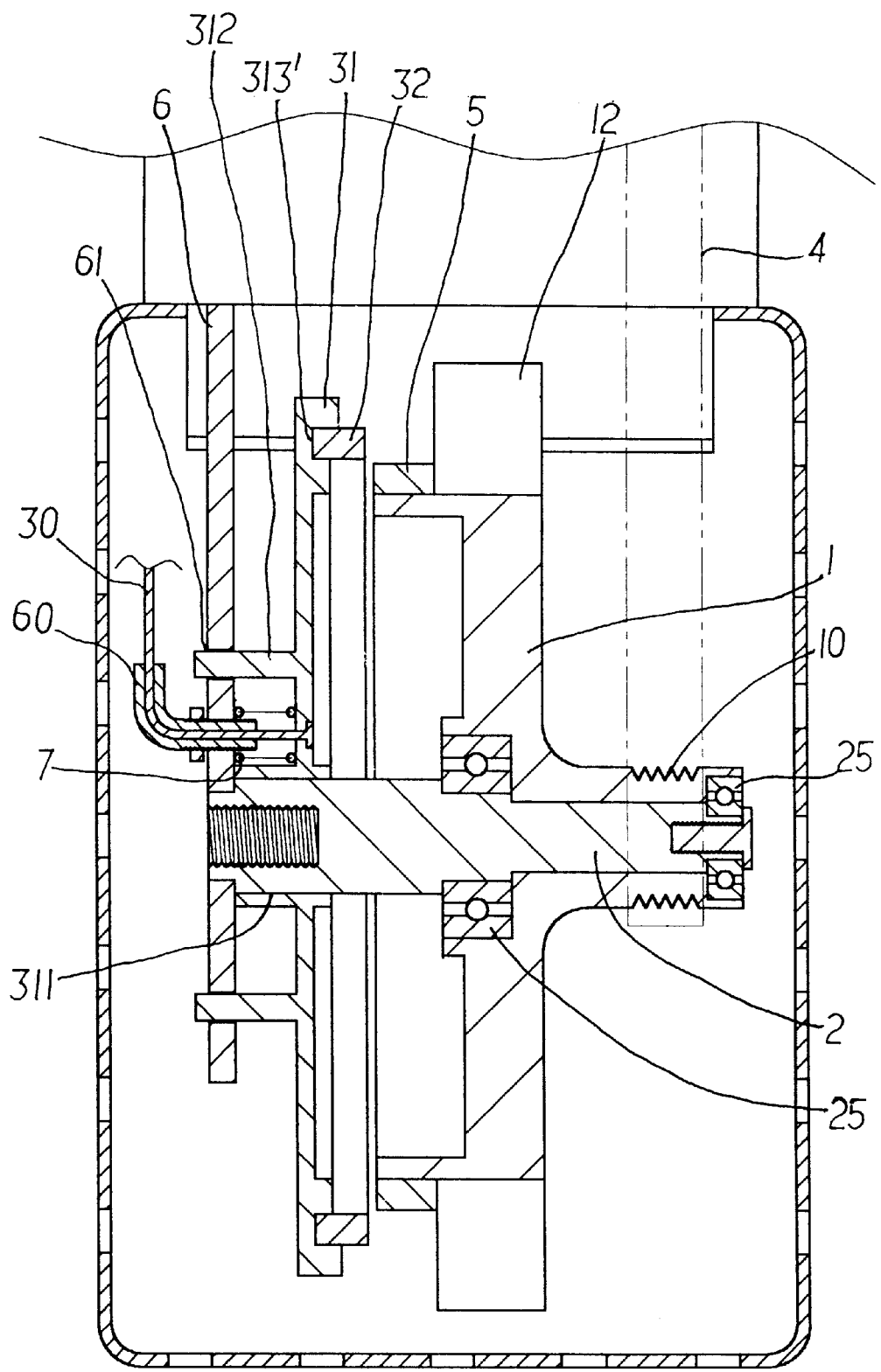
FIG·5

RESISTANCE ADJUSTING DEVICE FOR AN EXERCISE DEVICE HAVING A WHEEL DRIVEN BY A BELT

FIELD OF THE INVENTION

The present invention relates to a resistance adjusting device for a wheel driven by a belt. The wheel has blades on radial direction and magnetic members are connected to a side of the wheel, and a metal board is movably located adjacent to the magnetic members so as to generate resistance force to the wheel by adjusting a distance between the metal board and the magnetic members.

BACKGROUND OF THE INVENTION

A conventional exercise device employing belt and wheels generally includes a wheel with radial blades extending outward form the wheel and a belt is connected between a pulley mounted to a hub of the wheel and another pulley mounted to a shaft. The diameter of the two pulleys are different so that when the user runs on the belt, the wheel is rotated. The radial blades cause air resistant force. However, the resistance force is fixed and cannot be adjusted. Therefore, the exercise device cannot meet different users' needs. Although another exercise device disclosed in Taiwanese utility model patent publish number 292569 partially resolves the shortcomings mentioned, it involves too many parts and employs torsion springs to control the resistance force. A frequent maintenance is required.

The present invention intends to provide a resistance adjusting device for an exercise device wherein the users simply pull a cable to control a distance between a metal board and magnetic members on the wheel, the resistance is controlled.

SUMMARY OF THE INVENTION

In accordance with one aspect of the present invention, there is provided a resistance adjusting device for an exercise device which includes a wheel having a hub and a shaft extends through the hub. A plurality of blades extend radially outward from the wheel and a belt reeves the hub. The resistance adjusting device comprises a magnetic member connected to a surface of the wheel and a disk is movably mounted to the shaft. A recess is defined in a first surface of the disk for receiving a metal board therein. A panel is mounted to the shaft and a cable extends through the panel and is fixedly connected to the disk. A spring is biased between the disk and the panel so that when pulling the cable, the resistance force resulted from the attraction between the magnetic member and the metal board is changed.

The primary object of the present invention is to provide a resistance force adjusting device that has a simple structure and the resistance force can be adjusted.

The object of the present invention is to provide These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 4 is a cross-sectional view to show another embodiment of the resistance adjusting device of the present invention, and FIG. 5 is a cross-sectional view to show yet another embodiment of the resistance adjusting device of the present invention.

DETAILED DESCRIPTION OF THE PREFERRED EMBODIMENTS

Figure 1:
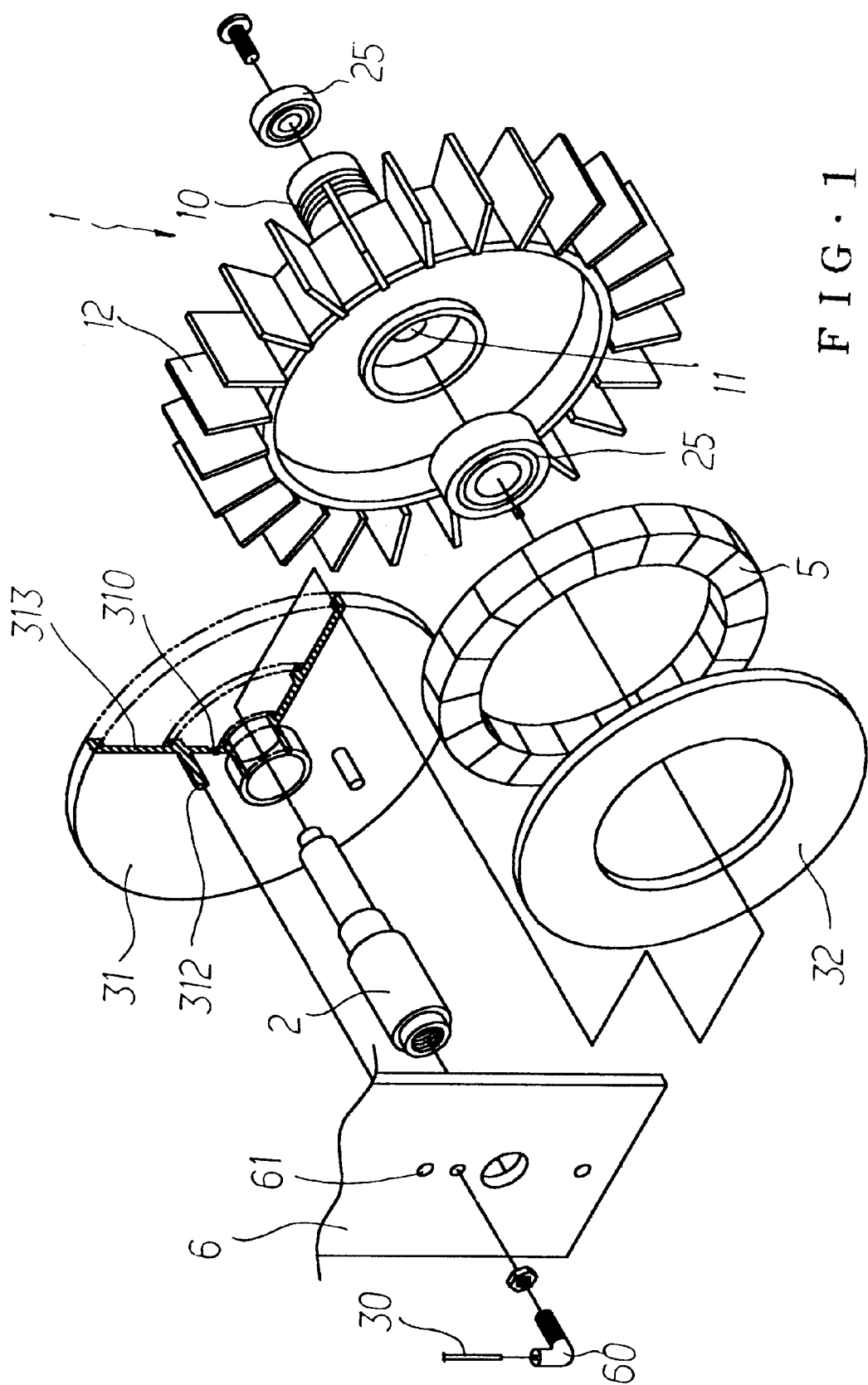
FIG. 1 is an exploded view to show a resistance adjusting device of the present invention.
Figure 2:
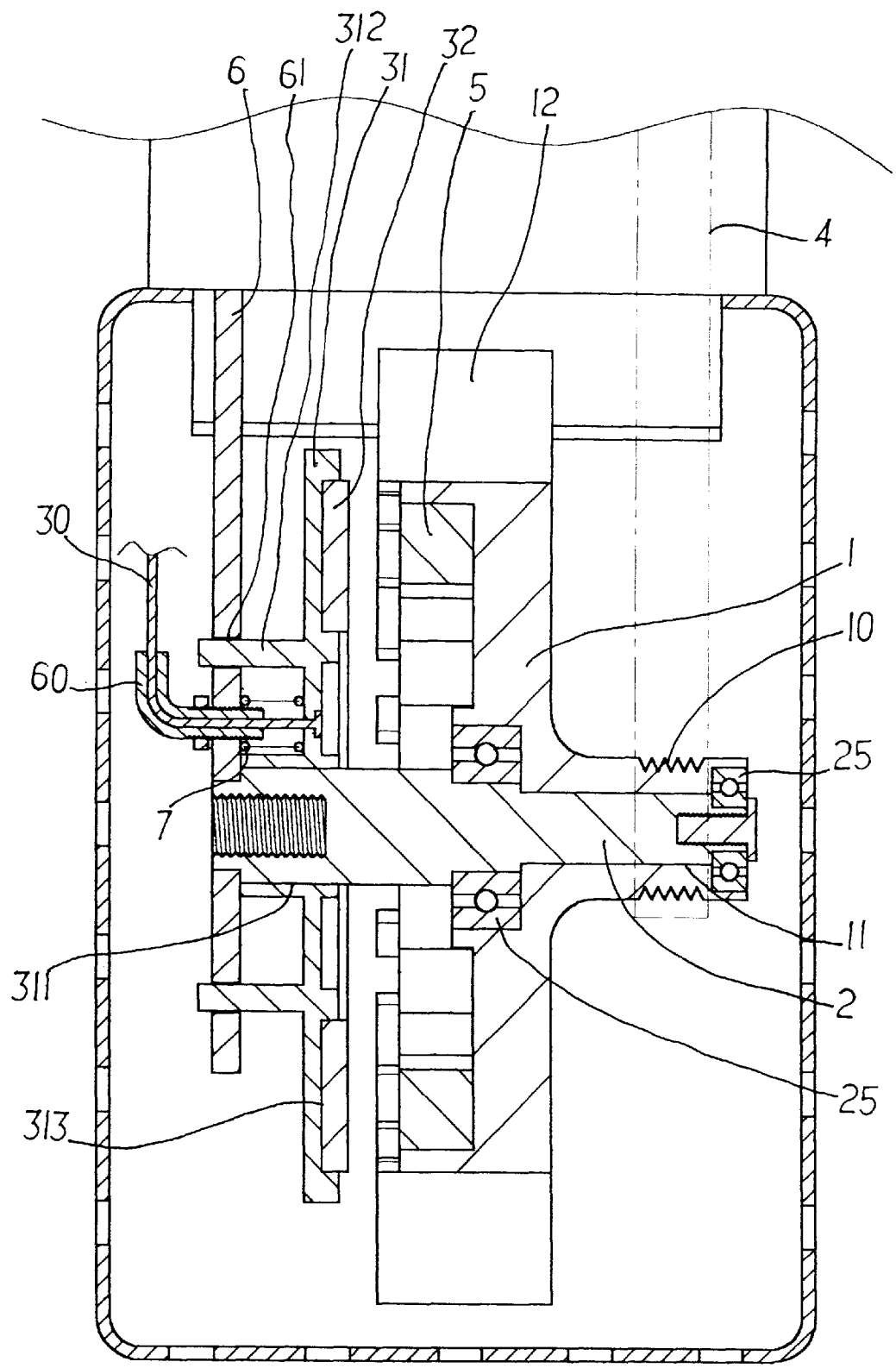
FIG. 2 is a cross-sectional view to show the resistance adjusting device of the present invention.
Figure 3:
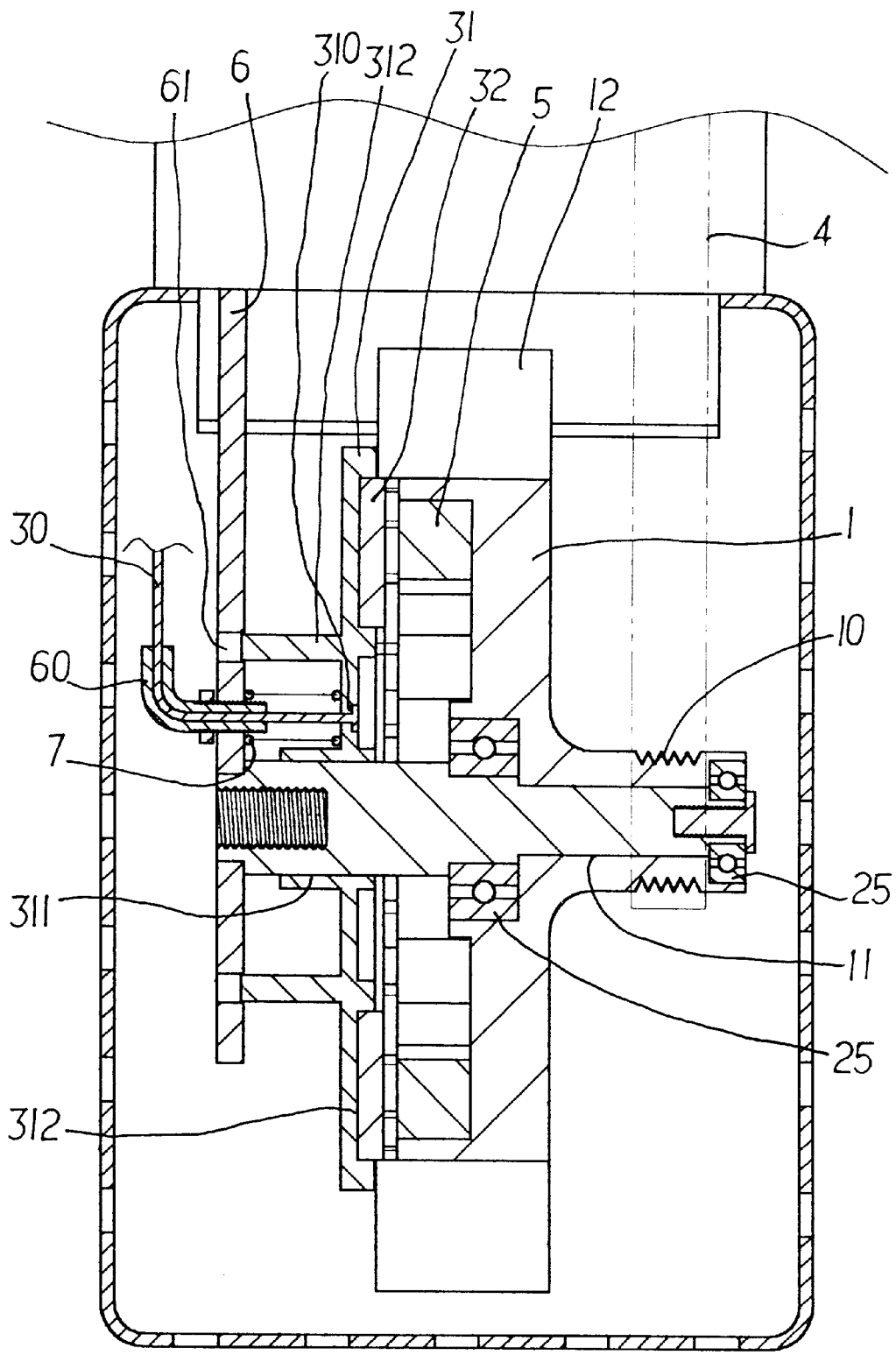
FIG. 3 is a cross-sectional view to show the resistance adjusting device of the present invention wherein the metal board is attracted toward the magnetic member.

Referring to FIGS. 1 and 2, an exercise device includes a wheel 1 having a hub 10 with a passage 11 defined therethrough and two bearings 25 are respectively engaged with the passage 11. A shaft 2 is rotatably inserted into the passage 11 with the two bearings 25 mounted to the shaft 2. A plurality of blades 12 extend radially outward from the wheel 1 and a belt 4 reeves the hub 10 so that when the belt is rotated, the wheel 1 rotates. The resistance adjusting device of the present invention comprises a ring-shaped magnetic member 5 which is engaged with a recess in a surface of the wheel 1. A disk 31 has a central passage 311 and the shaft 2 movably extends through the central passage 311. A recess 313 is defined in a first surface of the disk 31 and a metal board 32 is engaged with the recess 313 and faces the magnetic member 5. The metal board 32 is made of aluminum or alloy of aluminum. Two guide rods 312 extend from a second surface of the disk 31. A panel 6 is mounted to the shaft 2 and has two holes 61 defined therethrough so that the two guide rods 312 movably extend through the holes 61. An elbow member 60 extends from the panel 6 and a cable 30 extends through the elbow member 60 and is fixedly connected to an engaging hole 310 in the disk 31. A spring 7 is biased between the disk 31 and the panel 6 so that when a user pulls the cable 30, as shown in FIG. 3, a distance between the magnetic member 5 and the metal board 32 is changed. In other words, the attraction force between the magnetic member 5 and the metal board 32 can be controlled by pulling the cable 30. The larger distance between the magnetic member 5 and the metal board 32 is, the less resistance force is applied to the wheel 1.

FIG. 4 shows that the positions of the magnetic member 5 and the metal board 32 can be mutually changed. The magnetic member 5 is connected to the disk 31 and the metal board 51 is connected to the wheel 1.

FIG. 5 shows that the magnetic member 5 is put on an outer periphery of the wheel 1 and located beside the blades 12, and the recess is defined in a form of an annular groove 313' so as to receive the metal board 32 therein.

Because the distance between the magnetic member 5 and the metal board 32 decides the resistance force applied to the wheel 1 so that the resistance adjusting device meets different requirements.

While we have shown and described various embodiments in accordance with the present invention, it should be clear to those skilled in the art that further embodiments may be made without departing from the scope and spirit of the present invention.

What is claimed is:

1. A resistance adjusting device for an exercise device which includes a wheel having a hub with a passage defined therethrough and a shaft inserted into the passage, a plurality of blades extending radially outward from the wheel and a belt reeving the hub, said resistance adjusting device comprising:

a magnetic member adapted to be connected to a surface of the wheel and a disk adapted to be movably mounted to the shaft, a recess defined in a first surface of said disk and a metal board engaged with said recess;

a panel adapted to be mounted to the shaft and a cable extending through said panel and fixedly connected to said disk, and a spring biased between said disk and said panel.

2. The device as claimed in claim 1, wherein said disk has two guide rods extending from a second surface thereof and said panel has two holes for receiving said two guide rods therein.

3. The device as claimed in claim 1 further comprising an elbow member extending from said panel and said cable extending through said elbow member.

* * * * *